R. V. JONES.
SYSTEM OF HOT WATER STORAGE.
APPLICATION FILED APR. 7, 1908.
979,507.
Patented Dec. 27, 1910.
3 SHEETS—SHEET 3.
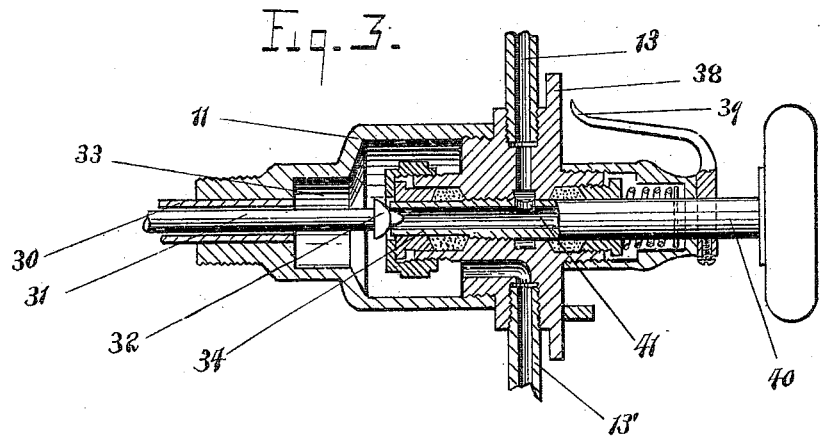
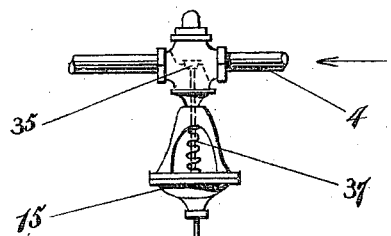
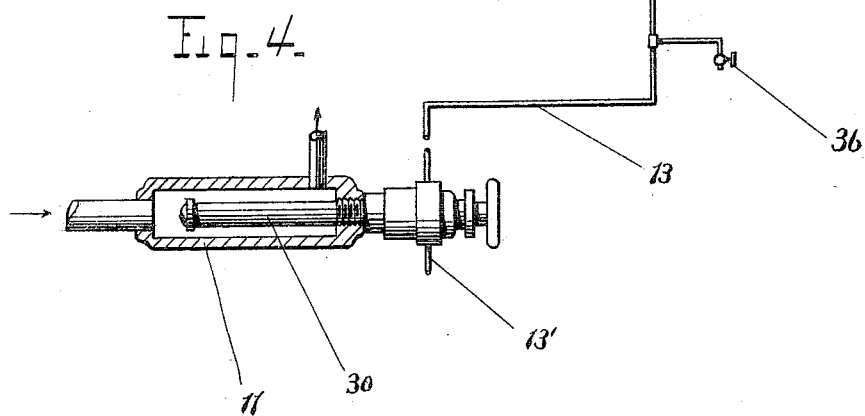
Witnesses:
Wm. F. Hammond
Herbert F. Parke
Robert V. Jones
Inventor
By his Attorney

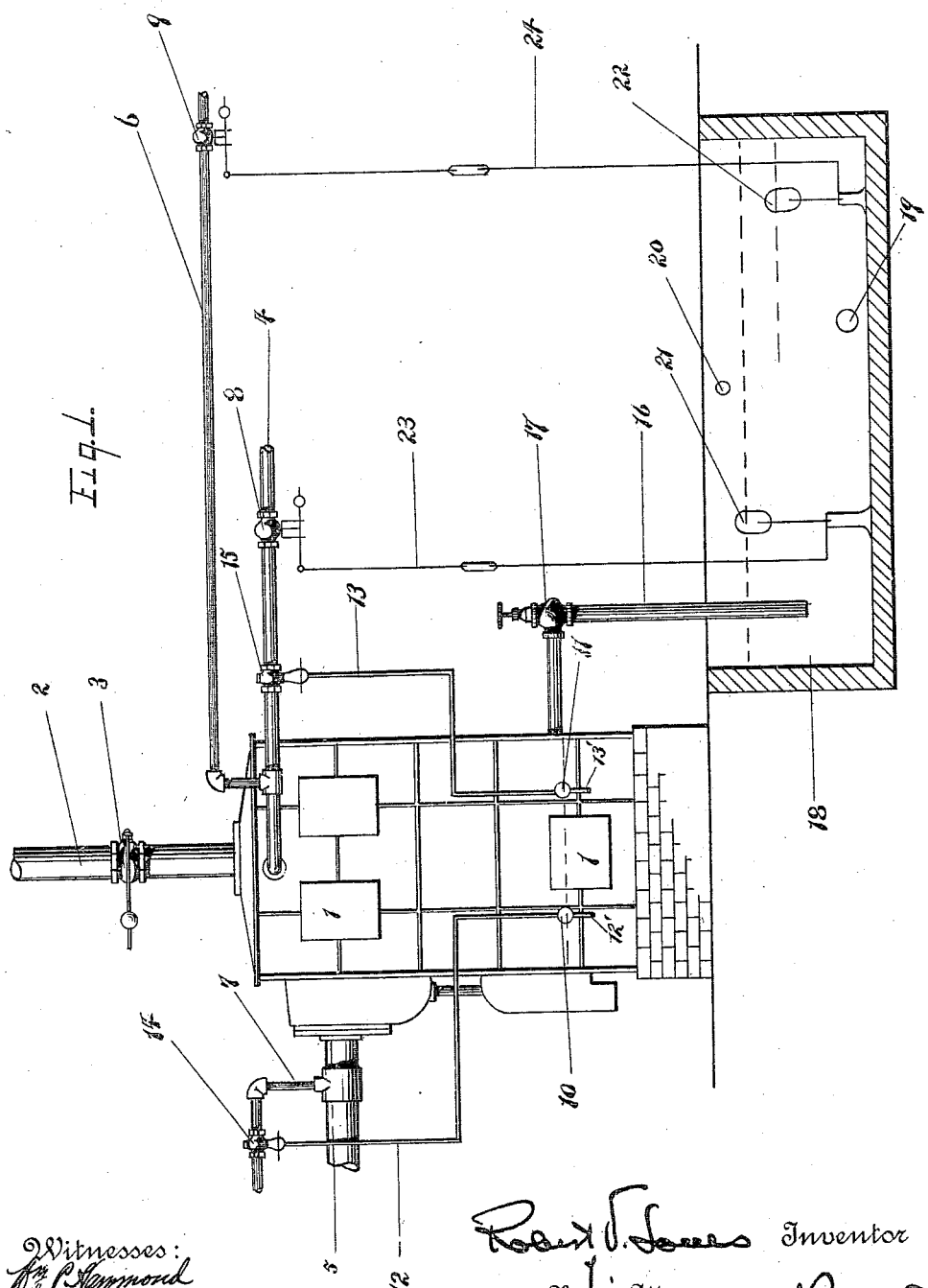

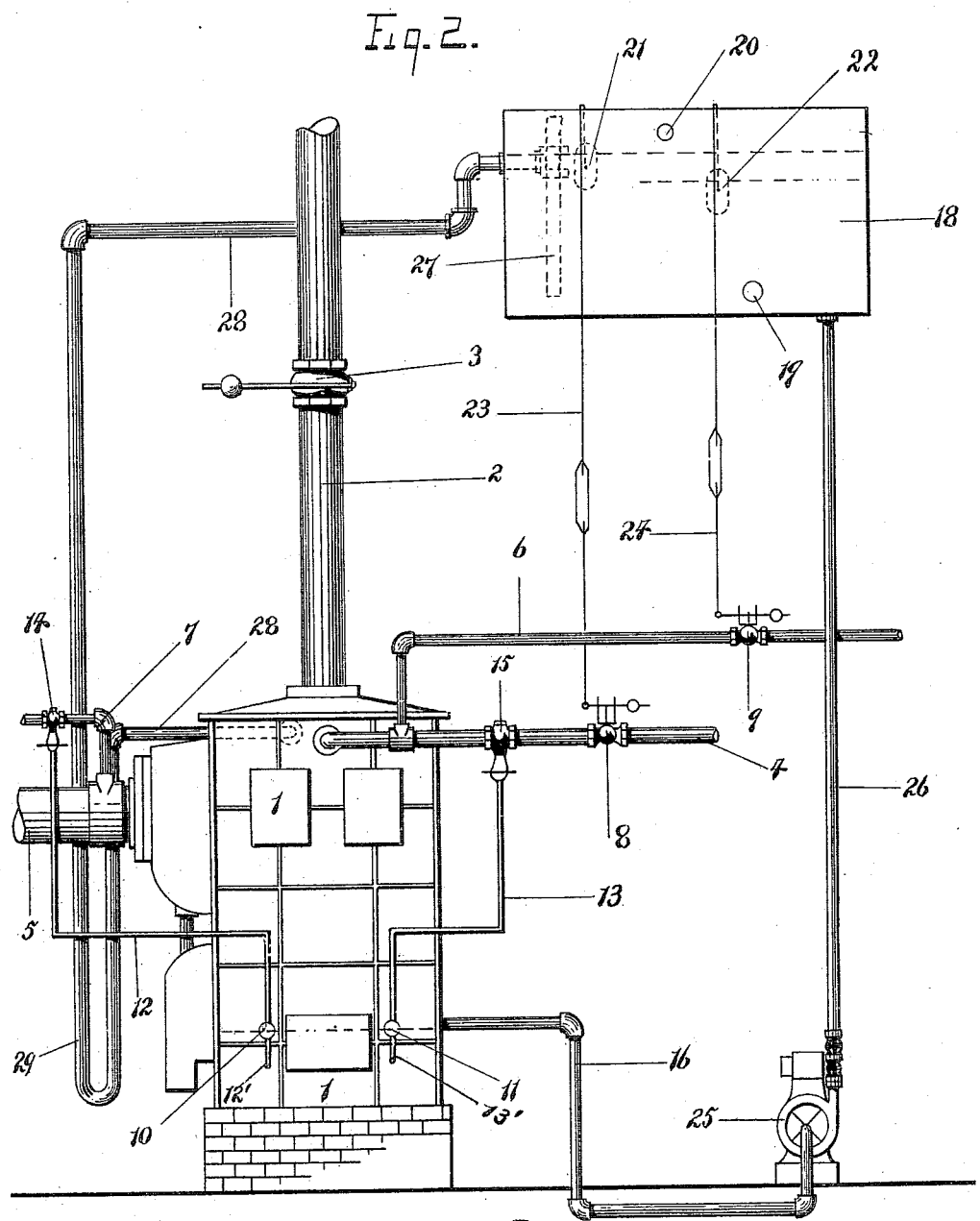

UNITED STATES PATENT OFFICE.

ROBERT V. JONES, OF KANSAS CITY, MISSOURI, ASSIGNOR TO JOSEPH S. LOVERING WHARTON, WILLIAM S. HALLOWELL, AND JOHN C. JONES, DOING BUSINESS UNDER THE FIRM NAME OF HARRISON SAFETY BOILER WORKS, OF PHILADELPHIA, PENNSYLVANIA.

SYSTEM OF HOT-WATER STORAGE.

979,507.  Specification of Letters Patent.  Patented Dec. 27, 1910.

Application filed April 7, 1908. Serial No. 425,651.

*To all whom it may concern:*

Be it known that I, ROBERT V. JONES, a citizen of the United States, and resident of and whose post-office address is 3745 Troost avenue, Kansas City, in the county of Jackson and State of Missouri, have invented certain new and useful Improvements in Systems of Hot-Water Storage, of which the following, taken in connection with the accompanying drawings, forms a full, clear, and concise description thereof.

My invention relates particularly to a system of hot water storage wherein a feed water heater operating under available steam is employed for heating a supply of raw water, and comprehends more particularly means for automatically proportioning and adjusting the amount of raw water to be heated to the amount of steam admitted to the heater.

In carrying my invention into practice, I employ a storage tank of sufficient capacity to contain a quantity of hot water ample to meet the demands of fluctuating conditions met with in some power plants. For instance, it has been experienced that at times there is available an amount of exhaust steam in excess of that which is required for heating the quantity of water necessary to meet the demands of the boilers at a given time, while at other times the amount of exhaust steam is quite insufficient for this purpose, and it is to satisfy these and similar conditions that my invention has been devised. With this end in view, I have devised means for controlling the amount of raw water entering the heater, by automatic mechanisms which operate to exactly proportion the amount of raw water admitted to the amount of steam available at a given time, so that the water is thus supplied in sufficient quantities to condense all of the supplied steam.

My invention further comprehends in combination with the above, means for maintaining the water within the storage tank at approximately a high uniform temperature, and means for admitting and controlling a supplementary supply of live steam to the heater.

Referring to the accompanying drawings, in which like reference numerals represent like parts throughout, Figures 1 and 2 illustrate, diagrammatically, views in elevation of systems involving my invention. Figs. 3 and 4 sectional details of the thermostat controlling device employed therein.

I preferably employ a feed water heater —1— of a well known open type, in which the raw water is brought into direct contact with the steam. The heater —1— is provided with an exhaust —2— leading to the atmosphere, in which is located a weighted back pressure valve —3—, all of which is of usual construction. A supply of raw water is admitted to the heater through pipe connection —4— and an exhaust steam supply through pipe connection —5—.

6— indicates a pipe connection in communication with pipe connection —4—, through which a supplementary supply of raw water may be admitted.

7— indicates a pipe connection in communication with the exhaust steam connection —5—, through which a supplementary supply of live steam may be admitted.

8— and —9— indicate float controlled valves in the raw water supplies.

10— and —11— indicate thermostatic devices which control, through means of the pipe connections —12—12'— and —13—13'—, and the regulators —14— and —15—, the admission of the live steam and the raw water to the heater.

16— indicates the outlet pipe connection to the heater. 17— a suitable hand-operated globe valve controlling the outlet —16—. 18— a storage tank provided with a suitable outlet —19— to boiler feed pumps (not shown) and an overflow —20—.

21—22— indicate floats within the storage tank, operating, through connecting mechanisms —23— and —24—, the respective valves in the raw water supplies.

Referring to Fig. 2, the storage tank —18— is elevated as shown. In order to store the water within the tank —18—, received through pipe connection —16— from the heater, I preferably employ a centrifugal pump —25—. A pipe connection —26— is employed for connecting the pump with the tank. In order to maintain the water within the tank —18— at a uniform high temperature, I provide a vertically arranged pipe —27—, which is open at both ends, the upper end extending above the water line, and a pipe connection —28— connected thereto; the latter pipe connection is water-sealed at —29— and has suitable connection with the heater at a point approximately opposite the raw water supply. The automatically operated thermostatic devices —10— and —11— are constructed and operate in like manner and therefore a description of one will suffice.

Referring to Figs. 3 and 4, in which I have illustrated in detail the construction of the thermostat —11—, which operates or controls the diaphragm valve —15— in the raw water supply—4—, I will proceed to describe the same:—Within the thermostat is located a device or tube —30— which lengthens by expansion as the temperature of the water within the heater rises, carrying with it rod —31— and causing valve —32— to open, which allows the water pressure from water main or other suitable source connected to and passing through pipe —13'— and filling space —33— to flow through pipe connections —34— and —13— to diaphragm valve —15—. The pressure of the water on the diaphragm serves to open the valve —35— and admit the flow of cold water through pipe connection —4— to the heater. When sufficient raw water has thus been admitted to condense the supply of exhaust steam and lower the temperature within the heater, the tube —30— contracts, causing the valve —32— to seat or close, thereby shutting off the water pressure from the diaphragm of the valve —35—, and as the drip valve —36— is always slightly open, the pressure will be taken off the diaphragm and thereby permit the spring —37— to close the valve —35— and cut off or reduce the supply of raw water to the heater. It will be readily understood from this, that the valve —35— is under the direct control of the thermostatic pipe —30— and that only the required amount of the water or steam, as the case may be, will be admitted through the valves —14— and —15— to maintain the desired temperature at the outlet to the heater.

The hot water regulator can be adjusted to operate at any desired temperature. To accomplish this adjustment, a dial or index is provided on the surface —38—, and a pointer —39— on the rotating spindle —40—. By rotating this spindle it is moved longitudinally, thus diminishing or increasing, as the case may be, the annular space between the end of the tube —34— and valve head —32—, the amount of pressure admitted to the diaphragm valve —15— depending thereon. The rotation of the spindle —40— also either increases or shortens the movement of the thermostatic rod —30—, thus causing the valve —32— to operate at the temperature desired. The operation of the system is as follows:—

The temperature of the exhaust steam entering the heater —1— through pipe connection —5— acts upon and operates the thermostat —11—, causing the valve —32— to unseat and allow the pressure water in pipe connection —13'— to pass through pipe connection —13— to the diaphragm valve —15—. The pressure thus put upon the diaphragm will cause the valve —35— to open and admit raw water into the heater in sufficient quantities to condense the exhaust steam entering through exhaust steam connection —5—. As soon as the temperature of the water falls the thermostatic device —30— contracts causing the valve —32— to seat, thus shutting off the water pressure from the diaphragm valve —15—. The valve —35—, under action of the spring —37—, will gradually close and diminish the supply of raw water feed to the heater. It will be understood that the action of the valve —35— is gradual, dependent wholly upon the fluctuating temperature of the water flowing through the heater so that the raw water supply admitted through pipe connection —4— will at all times be sufficient to condense all of the available exhaust.

As previously stated, the live steam supply is automatically controlled by a thermostat —10—. The supplementary supply of live steam is admitted to the heater to cover such periods when the exhaust steam supply is insufficient to heat the total amount of water required by the boiler feed pumps. Should the temperature of the water within the heater fall below the predetermined degree the thermostat —10— will operate to open the valve —14— in a similar manner to that heretofore described. The heated and purified water is fed through outlet —16— into a storage tank —18—. The storage tank —18— is provided with an outlet —19— leading to the boiler feed pumps or other points of use, and also an overflow —20—. Within the storage tank are located two floats —21—22—, the float —21— operating through connecting mechanism —23—, and the valve —8— thus controlling the admission of the raw water to the diaphragm valve —15— so that in the event of the boiler feed pumps being shut down, the storage tank —18— will not overflow and waste the hot water which it is desired to conserve. The float —22— operates the valve —9— through intermediate mechanism —24— for admitting and controlling a supplementary supply of raw water to the heater. This supply is not controlled by the temperature obtained within the heater, but is controlled positively by the water line within the storage tank —18— acting upon the float —22— as explained. The admission of a supplementary supply is important, should it happen for any reason that the boiler feed pumps were to take a supply of water from the storage tank —18— in excess of the amount being delivered from the heater under its normal working. Therefore, it will readily be seen, should the water level within the storage tank —18— fall below a predetermined point, the supplementary supply will automatically come into service and furnish the heater with a sufficient supply to meet the requirements of the boiler feed pumps, irrespective of the temperature obtained.

It will be understood that under normal working conditions the amount of water fed into the heater —1— is controlled by temperature conditions and not by the demands of the boiler feed pumps, and only when the demand exceeds this normal supply for an extended period is the supplementary supply added. To maintain the water within the elevated storage tank —18— at a uniform high temperature, I return the water to the heater —1—, when it falls below a certain temperature, and there re-heat it and then circulate it back to the storage tank and consequently the coldest water is returned to the heater through pipe connections —27—28—. Through this continuous circulation I maintain a supply of heater water within the storage tank at all times (see Fig. 2).

While a heater of the open type is illustrated and described, it is obvious that any type of heater may be advantageously used without in any way limiting the scope of the invention. It is likewise obvious that various changes may be effected in the construction and arrangement of the piping and other elements of the system described, without departing from the spirit and scope of the invention. Nor would I be understood to in any way limit myself to any particular purpose for which my system may be adapted.

Having now particularly described and ascertained the nature of my invention and in what manner the same may be performed, I declare that what I claim is:—

1. In a feed water heater, the combination of a thermostatically controlled raw water supply; an exhaust steam supply; a storage tank connected with said heater, and a supplementary float-controlled raw water supply for said heater, governed by the water level within the storage tank.

2. In a feed water heater, the combination of a thermostatically controlled raw water supply; an exhaust steam supply; a supplementary thermostatically controlled live steam supply; a storage tank connected with said heater, and a float-controlled raw water supply, governed by the water level within said storage tank.

3. In a feed water heater, the combination of a float-controlled raw water supply; a steam supply; temperature controlled means connected with the raw water supply and operating to govern the temperature of the water issuing from said heater.

4. The combination of a heater; a float-controlled raw water supply; a diaphragm valve in said raw water supply; a steam supply; and means operated by the temperature of the water within the heater for controlling said diaphragm valve.

5. The combination of a feed water heater; a valve controlled raw water supply; a steam supply; a thermostatic device within said heater connected with and governing said valve controlled raw water supply.

6. The combination of a feed water heater; a temperature controlled raw water supply; an exhaust steam supply; a temperature controlled supplementary live steam supply; a supplementary raw water supply; a storage tank in connection with said heater, and a float within said storage tank, controlling said supplementary raw water supply.

7. In a heater, the combination of an automatically controlled raw water supply; an exhaust steam supply; a supplementary raw water supply; an automatically controlled supplementary steam supply; a storage tank and auxiliary means within said storage tank, controlling said raw and supplementary water supplies.

8. In a system of the character described, the combination of a feed water heater; a float controlled raw water supply; a steam supply; a float controlled supplementary raw water supply; and a storage tank.

9. In a system of the character described, the combination of a feed water heater; a raw water supply; a steam supply; a supplementary raw water supply; a storage tank; means within said storage tank controlling both raw water supplies.

10. In a system of the character described, the combination of a feed water heater; a temperature controlled raw water supply; an exhaust steam supply; a supplementary raw water supply: a temperature controlled supplementary steam supply; a storage tank; and floats within said storage tank operating to control said raw water supplies.

11. In a feed water heater, the combination of a temperature controlled raw water supply; a steam supply; an outlet; a storage tank connected with said outlet; and means for circulating water through said heater and said storage tank.

12. The combination of a feed water heater; a valve controlled raw water supply; a steam supply; an outlet; means within the heater connected with and controlling said raw water supply; a storage tank connected with said outlet; and means connected with said storage tank and heater for returning water to the heater.

13. The combination of a feed water heater; a raw water supply; a steam supply; an outlet; a thermostatic control for said raw water supply; an elevated tank connected with said outlet; and means for circulating water through said heater and storage tank.

14. The combination of a heater; a raw water supply and an exhaust steam supply; an automatically controlled supplementary steam supply; an outlet; automatically operating means for said raw water supply; an elevated storage tank connected with said outlet; a pump intermediate said heater and storage tank; a water-sealed pipe connection intermediate said storage tank and said heater; and means for returning water from the lower strata within the storage tank to the heater through said pipe connection.

15. In a feed water heater, the combination of a temperature controlled raw water supply; a steam supply and a float controlled supplementary raw water supply.

16. The combination of a feed water heater; a thermostatically controlled raw water supply therefor; an exhaust steam supply; a storage tank connected with said heater; a supplementary float controlled raw water supply for the said heater governed by the water level within the storage tank, and a float controlled valve in the main raw water supply governed by the water level within the storage tank.

17. The combination of a feed water heater; a raw water supply thermostatically controlled from within the heater; an exhaust steam supply; an auxiliary live steam supply thermostatically controlled from within the heater; a storage tank connected with said heater; and means controlled by floats within the storage tank controlling both the main raw water supply and the supplementary raw water supply for said heater.

Signed at Kansas City in the county of Jackson and State of Missouri this 28th day of March 1908.

ROBERT V. JONES.

Witnesses:
   Jno. H. Thacher,
   H. L. Manson.